Nov. 6, 1934.  O. A. KNOPP  1,979,471
ELECTRIC HEATER
Filed May 26, 1930  2 Sheets-Sheet 1

INVENTOR
Otto A. Knopp
BY John Flane
ATTORNEY

Patented Nov. 6, 1934

1,979,471

UNITED STATES PATENT OFFICE 1,979,471

ELECTRIC HEATER

Otto A. Knopp, Oakland, Calif.

Application May 26, 1930, Serial No. 455,885
In Germany May 27, 1929

2 Claims. (Cl. 219—37)

This invention relates to an electric heater of the hot plate type, and especially to a temperature controlled hot plate.

In my prior patent, No. 1,696,684, granted December 25, 1928, I describe a hot plate of this general characteristic. Incorporated with the hot plate is a temperature control device whereby the hot plate, in spite of its considerable mass, is initially heated by an element energized considerably above its normal operative condition, so as to bring the hot plate from a cold condition, rapidly to the desired operating temperature. In that patent, I disclose a bimetallic thermostatic switch that operates upon the attainment of the desired temperature to reduce the energization to a normal working value. In this way, the inevitable "heat lag" always present in hot plates of considerable mass is very materially reduced.

My present invention relates to a similar system, but in which the temperature controlling device is arranged differently. It is an object of my invention to simplify the structure and to provide a more compact arrangement of the various elements.

It is another object of my invention to improve in general on hot plates of this character.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings.

Figure 1:
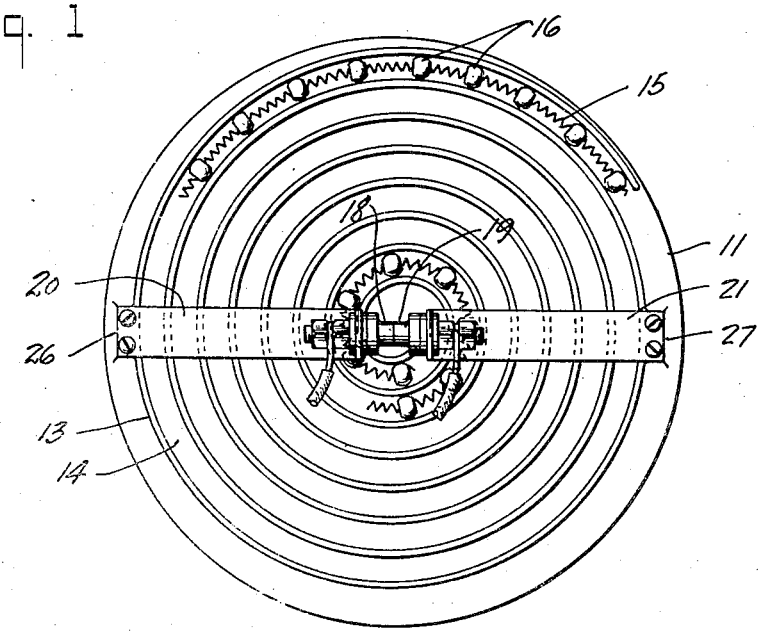
Figure 1 is a bottom plan view of a hot plate incorporating my invention.
Figure 2:
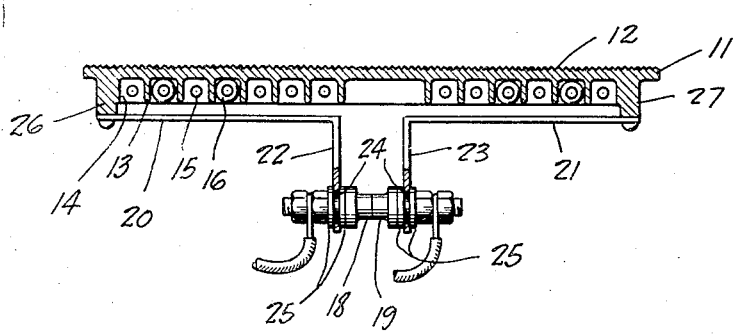
Fig. 2 is a cross section thereof.
Figure 3:
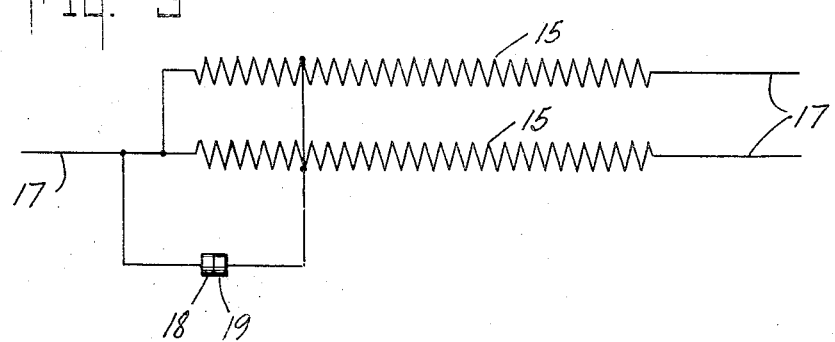
Fig. 3 is a wiring diagram of the hot plate.

In the form of my invention illustrated in Figs. 1, 2, and 3, I show a metal plate 11, having a heating surface 12 which is shown as corrugated in the present instance. Depending from the plate 11 is a spiral flange 13, forming the deep, open groove 14. This groove accommodates the heating element or coil 15, which can be insulated from the sides and bottom of groove 14, as by the aid of beads 16. The plate 11 and the flange 13 can be cast integrally, as of cast iron, to receive and transmit heat to the surface 12.

As in my prior patent, a portion of element 15 can be short circuited during the starting period, in order to increase the degree of energization. As shown in Fig. 3, the element 15 can be divided into two sections which can be placed either in series or parallel in mains 17. During the starting period, contacts 18, 19 are closed to short circuit a portion of each section. These contacts open when that degree of heat is attained which is the desired operating value.

To effect the control of these contacts 18, 19, I mount them respectively on bars 20, 21. Thus each of these bars has a depending portion 22, or 23, which are placed opposite each other, and which carry the contact posts 18, 19. These posts are of course insulated, as by the bushings 24 and washers 25. The outer ends only of these bars are fastened to substantially diametrically opposite points of the plate 11, as on bosses 26, 27. The bars 20, 21 are made from material having a small or no coefficient of expansion, such as invar metal, so that as plate 11 expands with a rise in temperature, the bars 20, 21, remaining constant in length, separate and pull contact posts 18, 19 apart, thereby reducing the energization of the element 15.

It is thus seen that the hot plate itself serves as one element of a bimetallic arrangement to produce a control of contacts 18, 19. Furthermore, the parts can be so proportioned that the separation of the contacts is effected upon a definite, normal temperature being attained by the hot plate 11. This proportioning is permitted by the resilience of the bars 20, 21.

Figure 4:
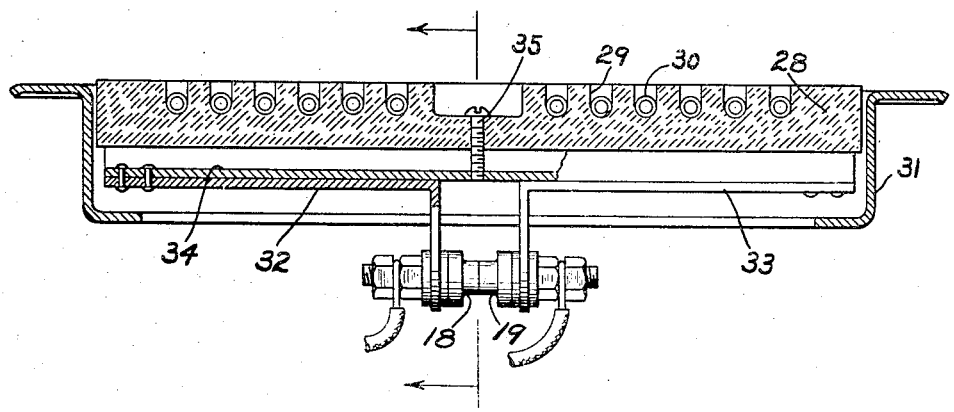
Fig. 4 is a section of a different form of my invention.
Figure 5:
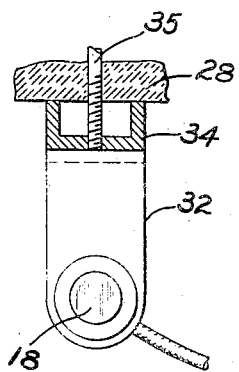
Fig. 5 is a section, taken along plane 5—5 of Fig. 4.

In the form just described, the hot plate itself is metallic. In some instances, the hot plate is made from ceramic material, to form an open type. Such a plate is illustrated in Figs. 4 and 5. In this case, the ceramic plate 28 has the open spiral groove 29 in which the element 30 is placed. The whole hot plate can be appropriately supported in a flanged casing 31.

In order to control the short-circuiting contacts 18, 19 in this form, they are again supported on invar bars 32, 33. In this instance, however, the other element of the bimetallic device is formed by a metal cross piece 34, shown as of channel shape, and held in good thermal conducting relation with the bottom of plate 28. To permit channel 34 to expand without buckling, it is held to plate 28 at its center only, as by a screw 35. It is thus seen that in this form, the channel iron 34 performs the same function, so far as the temperature control is concerned, as the hot plate 11 of the form first described.

I claim:

1. In a device of the character described, a metallic member adapted to be heated, a heating element therefor, a pair of bars having a low coefficient of expansion, placed below the metallic member, a contact carried at one end of each of the bars, the two contacts cooperating to control the degree of energization of the element, said bars being fastened to the metallic member, at those ends which are opposite the contacts.

2. A member adapted to be heated made from metal having a substantial coefficient of expansion, a heating element therefor, a pair of bars of low coefficient of expansion, each bar being fastened at one end near the edge of the member and extending toward each other, and a contact respectively supported on each inner end and cooperating to control the degree of energization of the heating element.

OTTO A. KNOPP.